United States Patent [19]
Atsumi

[11] Patent Number: 5,680,613
[45] Date of Patent: Oct. 21, 1997

[54] DATA PROCESSING SYSTEM USING VERSIONED DOCUMENTS HAVING TEMPORARY LINKS

[75] Inventor: Ryo Atsumi, c/o Mitsui Engineering & Shipbuilding Co., Ltd. 6-4, Tsukiji 5-chome, Chuo-ku, Tokyo 104, Japan

[73] Assignee: Ryo Atsumi, Chiba, Japan

[21] Appl. No.: 5,459

[22] Filed: Jan. 19, 1993

[30] Foreign Application Priority Data

Jan. 17, 1992 [JP] Japan ................ 4-026272

[51] Int. Cl.$^6$ .................................. G06F 17/30
[52] U.S. Cl. .................. 395/614; 395/701; 395/964
[58] Field of Search ........................ 395/146, 147, 395/148, 149, 150, 151, 152, 153, 155, 164, 600, 161, 500, 575, 800, 650, 614, 701, 619, 964; 364/DIG. 1

[56] References Cited

U.S. PATENT DOCUMENTS

| | | | |
|---|---|---|---|
| 4,739,477 | 4/1988 | Barkar et al. | 364/300 |
| 5,133,075 | 7/1992 | Risch | 395/800 |
| 5,181,162 | 1/1993 | Smith et al. | 364/419 |
| 5,206,951 | 4/1993 | Khoyi et al. | 395/650 |
| 5,297,279 | 3/1994 | Bannon et al. | 395/600 |
| 5,347,653 | 9/1994 | Flynn et al. | 395/600 |
| 5,418,964 | 5/1995 | Conner et al. | 395/700 |
| 5,535,386 | 7/1996 | Wang | 395/619 |
| 5,551,028 | 8/1996 | Voll et al. | 395/614 |

OTHER PUBLICATIONS

Microsoft Press Computer Dictionary, Second Edition, pp. 137-138 Dec. 1993.

"Merged Models (CAD-CAM Applications)"; Kim, Won; Chou, Hong-Tai, UNIX Review, V6, N5, P48(11); May, 1988.

"Introduction to Object-Oriented Databases", Won Kim,The MIT Press, Cambridge, Mass., 1990.

91-DBS-84, Ryo Atsumi, "The Structure of an Object-Oriented Database Worksheet Program", Jul. 17, 1991, (English translation attached), pp. 21-30.

91-DBS-84, Ryo Atsumi, "The Concept of an Object-Oriented Database Worksheet Program", Jul. 17, 1991, vol. 91, No. 65 (English translation attached), pp. 11-20.

Ryo Atsumi, "The Concept of an Object-Oriented Database Worksheet Program", Contributed Jul. 17, 1992 to TIMS/ Organization Science.

"Object Versioning in Ode", Agrawal et al., Data Engineering, 1991 7th International Conference, IEEE Jan. 1991.

*Primary Examiner*—Thomas G. Black
*Assistant Examiner*—Hosain T. Alam
*Attorney, Agent, or Firm*—Oliff & Berridge

[57] ABSTRACT

The processing operations of an actual desk work can be executed as they are, and the efficiency of data processing work can be significantly improved by utilizing the processing capability of a computer system. A data processing system utilizing computer processing a means for generating a versioned documents which is confined and comprehesive type of tables/lists for maintaining initial data in their original state as they are, a means for generating a ledger which is a table/list including information which vary and change with time, and a means for generating a document control register which is a kind of ledger for maintaining the identification of tables/lists for controlling. The above-mentioned document control register has a portion for identifying and controlling its own records and tables/lists which are the object of control and a portion for controlling their conditions for use and states so that all document data can be included, controlled, and maintained by this document control register. In particular, the versioned documents maintain temporary links between the objects of control.

19 Claims, 13 Drawing Sheets

X1 : REGION CONTROL
X2 : EOD (End of Data)
X3 : DATA REGION
X4 : EOR (End of Record)

X1 : REGION CONTROL
X2 : POINTER
X3 : EOD (IF SPECIFIED)

DATA PROCESSING SYSTEM USING VERSIONED DOCUMENTS HAVING TEMPORARY LINKS

BACKGROUND OF THE INVENTION

The present invention relates to a data processing system, and more particularly to a data processing system capable of performing integrated data processing operations by controlling a variety of operations in a unified manner.

Hitherto, devices and methods such as an automatic program, a design control system, CAD, CAM, an engineering data base, CIM, SIS, and the like have been provided and employed in ordinary office work, design control, and production control operations.

Each of the aforesaid conventional processing apparatuses and processing methods contains specific data processing procedures which are different from the processing procedures appropriate for actual work, and its system is constituted based on a simplified model.

Furthermore, conventional methods lack the viewpoint that all of the actual operations must be the objects. Also, data must be processed in these conventional methods so as to be applicable to the employed methods, and the structure is constituted to conform to rules which are different from the actual operation procedures. Therefore, the conventional data processing methods encounter problems in that it takes an excessively long time to prepare the operation procedure causing such problems as high cost, the necessity of a large amount of data input work, and the system easily becoming out-of-date. Thus, they could not be a data processing system appropriate for the actual operation system.

SUMMARY OF THE INVENTION

The object of the present invention is to provide a data processing system capable of executing actual desk work operations as they are and significantly improving the efficiency of data processing work by utilizing the processing capability of a computer system.

In order to achieve the aforesaid object, a data processing system according to the present invention is a data processing system utilizing computer processing comprising the following: versioned documents which are a confined and comprehensive type of tables/lists maintaining initially inputted data as they are; a ledger which is a table/list for maintaining data regarding input information which are variable; and a document control register which is a kind of ledger for maintaining the identification of the tables/lists and performing control. The aforesaid document control register has indexes for identifying and controlling its own records and the tables/lists, which are the object of control, has indexes for referencing to versioned documents, ledger, and document control register under the control of itself or other document control registers, and has a portion for controlling any changes in its own records and tables/lists which are the object of control, and a portion for controlling the conditions for use and the states of its own records and tables/lists which are the object of control, so that this document control register enables access to all documents concerned.

The tables/lists comprising the versioned documents, the ledger, and the document control register of this data processing system have an integrated form/data table for storing the data for the tables/lists, a form table for storing the fixed portion of data of the tables/lists, a data table for storing the variable portion of data of the tables/lists, a format table for storing the formats of the tables/lists, a process execution module and a process internal table for storing the processing procedures of the tables/lists, plural index tables composed of arbitrary data item groups for retrieving the tables/lists, a reference table for storing the retrieval conditions for calling the reference tables/lists, a referred table list for recording used reference tables/lists, an intermediate file for processing large-capacity tables/lists, and a storage portion for storing arbitrary tables specified by users other than those mentioned above, and can take a unified structure comprised of the versioned documents, commands which are a kind of versioned documents, the ledger, and the document control register.

The aforesaid document control register is capable of accepting the classification numbers of users, distinguishes between new generation, revision, updating, cancellation, and restoration for controlling any changes in its own records and tables/lists which are the object of control, has a time stamp for controlling the time sequence, is capable of possessing information on the purpose of usage, their states, and the conditions of application, and is comprised of record groups which can not be changed except when specially instructed by a user to cancel or restore.

The aforesaid tables/lists which constitute the versioned documents, the ledger, and the document control register have individual or plural specified formats for individual external storages, internal storages, displays and external outputs, and furthermore have free formats for data items, data forms, and display forms specified by individual users, and formats for arbitrary retrieval, and can be structured to include the data processing procedures by commands or programs and enable plural tables/lists to be connected and operated together.

Furthermore, this data processing system is comprised of: (1) an internal table register mechanism for finding the specified one out of plural versioned documents, ledgers, document control registers, and records having the same index in an external storage device, transfering it onto the internal storage device as required, and relating, if it is constituted by plural elements, the elements to one another by links, (2) a command internal table register mechanism for commands which are a kind of versioned documents, (3) a process internal table register mechanism for independent processes which are a kind of versioned documents, (4) a display register mechanism for relating the elements constituting the table/list which is the object of processing to one another by links and for relating them to those controlled by the internal table register mechanism, (5) a message register mechanism for relating the elements constituting the messages which are orders for execution to one another by links, relating them to those controlled by the command internal table register mechanism, and editing the commands and the versioned documents, the ledger, and the document control register which have procedures so as to enable them to be processed, and sending them to the process register mechanism, (6) a process register mechanism for relating direct messages which are processing commands to processes which are processing procedures, relating them to those controlled by various internal table register mechanisms, making the individual processes process the direct messages, and returning the results to itself or other mechanisms, and (7) a display mechanism including a display number register mechanism for controlling individual displays and a display table mechanism, a display register mechanism, and an auxiliary mechanism for displaying.

As a result of the above structure, a worksheet system can be formed by adding the operation procedures to all of the versioned documents, the ledger, and the document control register, and thus the operations in an office can be computerized easily. And a sub-system can be constituted by each display of the versioned documents, ledger, and document control register and the computerized operation procedures, that is, by the worksheet display. Furthermore, a computer-aided system can be constituted by plural worksheet displays. As a result, each table/list of a versioned document, ledger, and document control register can be easily made by the user, can be changed during use. They can be classified and controlled by the document control register and parts explosion and parts list addresses, and backup/recovery can be done by storage rules.

According to the data processing system mentioned above the execution of operations by the newly proposed worksheet program method enables actual handwriting work to be performed on a display as it is, with an excellent effect to be obtained in that the efficiency of data processing work can be significantly improved by utilizing the processing capability of a computer system.

DESCRIPTION OF PREFERRED EMBODIMENTS

Figure 1:
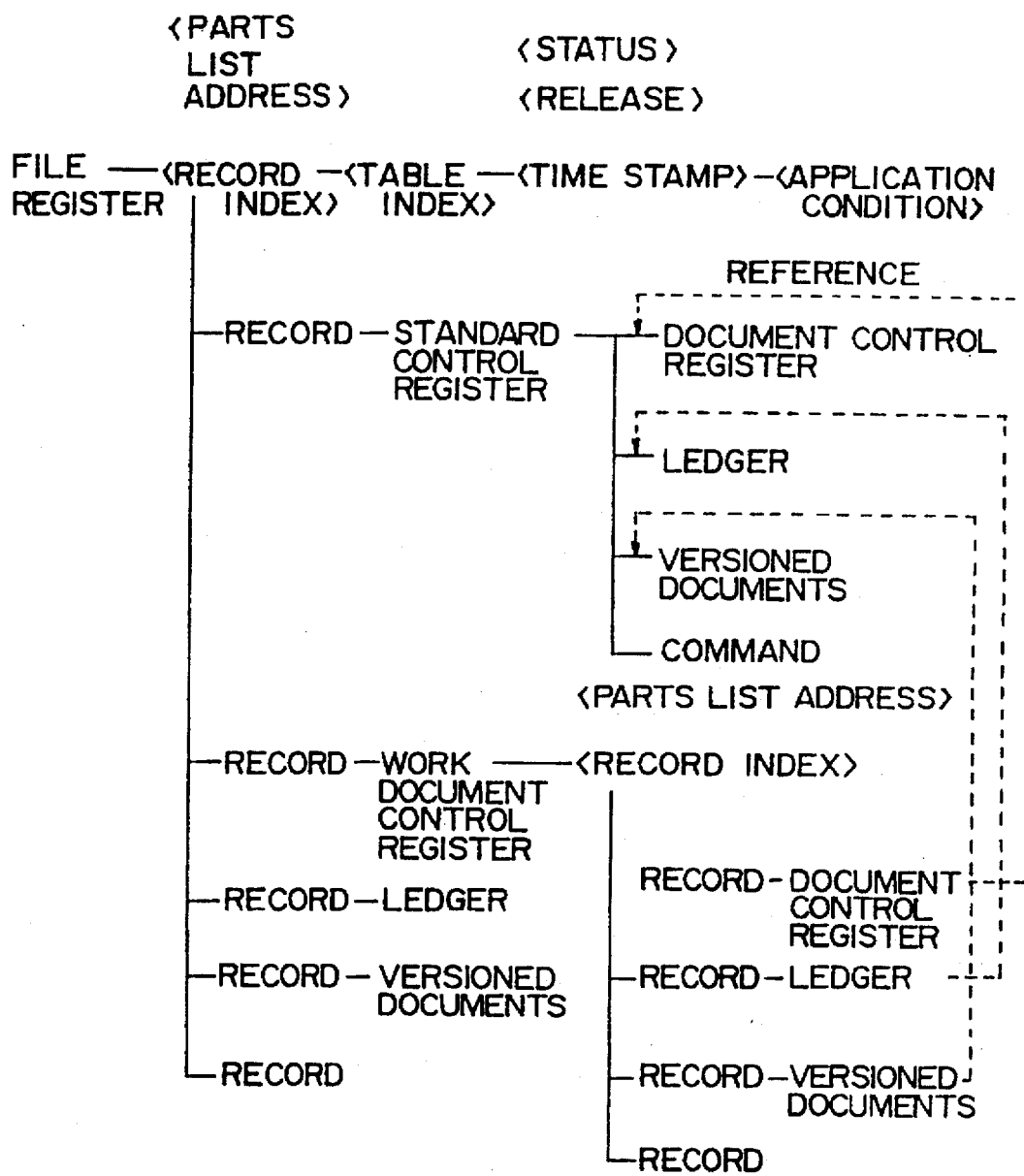
FIG. 1 is a tree which illustrates the data structure.

Preferred embodiments of the data processing system according to the present invention will now be described in detail.

This embodiment has been implemental so that office work by handwriting has been selected as the real world to be the object of data processing, and uses it as a tool enabling the actual office work procedure to be processed on a display as it is.

<Contents of Office Work>

First, office work by handwriting is characterized by distributed processing in the individual units of an organization, its holonic architecture, high level information processing, see-through & open nature, and tentative information processing potentials. Furthermore, such office work by handwriting must meet the following requirements:

(1) Information (documents) can be categorized into the following three categories; versioned documents, ledger, and control register.

(2) A worksheet (object) formed by integrating data and procedures is effective.

(3) Parts explosion including information (documents) and work/services is possible.

(4) Classification by defining addresses (parts list address) in a parts list is applicable.

(5) Office work is precisely controlled by a document control register.

Under the above assumptions, the document system of individual unit organizations in an actual office work is structured as follows:

1. Document control registers such as a standard ledger, an order ledger, and document catalogues for individual orders are prepared.

2. Classifications such as document function classification and parts classification are provided as necessary in the document control register.

3. Identification of documents in accordance with the document number and the revision number is made, and such documents are registered in the document control register.

4. The attributes for control such as status, state of release, and data are recorded.

5. In the case of drawings, the parts name, specification, quantity, and parts drawings are specified by using a parts list using the parts number as index. At this time, specific contents such as "standard parts" are written in other documents and only a form for making reference to them exists.

In the thus constituted document system, the following ideas have been implemented.

First, the structure is made shallow. In order to make the hierarchy of control to be shallow and to further improve the glancing facility, the classification code has been structured so as to enlarge the number of elements contained in one document control register and one document. For example, names which are ordinarily used are used as a classification code for the document control registers, and classification codes in the form easily memorized during daily operation are used in the document control register. In the document level, the following are exemplified: a parts list or a corresponding form is used into which information is centralized, reference is made to other drawings contained in the same document control register, etc.

A time sequential system is the second idea. The original issued document and its record in the document control register are stored in order to deal with continuous changes. It should be noted that plural documents having different revision numbers but given the same document number are commonly present in the following cases, that is, the case where the effective date is specified in order to absorb the delay of propagation of information or to exclude an already started action to be effective, the case where a range is specified in order to specially treat a specific region, customer, or order, or the case where plural products are manufactured from the same drawing, for example, control by product serial number is applied in order to make some changes in the second and succeeding product after the manufactured of the first product has been completed. Also, it should be noted that the latest document only is insufficient to reproduce the past state. From the aforesaid knowledge, the data processing apparatus according to this embodiment employs a worksheet program method in order to realize the document system of the type described above. This is due to the fact that the three types of information (documents), that is, versioned documents, ledger, and document control register, cover the overall office work by handwriting, and so all of these versioned documents, ledger, and document control register are formed into work sheets by adding the operation procedures. As a result, the operation procedure can easily be computerized, and individual displays of the versioned documents, ledger, and document control register and the computerized operation procedures, that is, the worksheets, can constitute one subsystem. Furthermore, plural worksheet displays are used to constitute a computer-aided data processing system. In this case, the worksheet is a type of object having both data and procedure.

From the aforesaid viewpoint, versioned documents, ledger, and document control register are defined as follows:
Versioned documents:

A confined and comprehensive type of tables/lists whose information at a certain time is fixed and retained permanently, such as slips, form sheets, numerical tables, texts, pictures, or drawings.
Ledger:

A table/list whose information is variable and is changed at any moment, such as a delivery ledger, accounting books, an order book, a name list, or a bankbook.
Document control register:

A kind of ledger which holds the indexes of tables/lists in its own individual records, and controls them, such as a document control register, a stock register, or an X-ray film register.

Among the above three types of information (documents), the document control register plays the most important role in the system. It treats a record as an independent and invariable unit and has the following three functions: the first function is an index function for discriminating between the record itself and tables/lists; the second function is a change control function to control any addition, revision, updating, and deletion of the record itself and tables/lists; and the third function is a release control function to show the condition for use (releasing) and the current status of the record itself and tables/lists.

The units of business work including office work consist of four retrieving information (documents), processing/deciding, ordering/reporting, and storing information (documents). Therefore, the system of business work can be expressed as any combination of the following elements.
(1) Retrieval/storage Standardization, rationalization, and automation of information (document) storage and retrieval procedures.
(2) Processing/judgement Standardization, rationalization, and automation of individual and consecutive processing/judgement making procedures.
(3) Ordering/reporting Standardization, rationalization, and automation of information (document) issuing/receiving procedures.

Therefore, operation procedures are added to each of the previously defined versioned documents, ledger, and document control register so as to be formed into a worksheet making data processing by a computer-aided system possible.

From the aforesaid viewpoint, a novel data processing system using the worksheet program method is provided according to this embodiment.
<Structure of Document>

The contents of document control is clarified prior to making a description about the actual structure because document control plays an important role in office work by handwriting.

The document structure in ordinary office work, in principle, has no limit of the document length, and variable length can be realized by connecting fixed length units called "lines". Thus, in the worksheet program method, fixed-length records are connected by pointers to realize and control a variable-length document structure. In this case, decimal numbers, hexadecimal numbers, and floating point numbers are provided because numbers are present besides ordinary characters in a document. In this method of expressing numbers, the limit of length is eliminated. It is further preferable that integers, binary numbers, and floating point numbers are permitted for computers.
<Document Issuing Procedure>

The document issuing procedure can be classified into a document preparation process until authorization for form issuance and a formal issuing process.

A document preparation process in unit or organization in the manufacturing field or the like consists of the following procedure:

(1) Study is performed by making a drawing for such a study, etc.

(2) A draft is made on the basis of the result of the study.

(3) An original drawing is made or modified on the basis of the draft.

(4) The original drawing is checked, and returned if there exists any error or question.

(5) Allow the issue of an accepted drawing.

Usually, a drawing or a document number consists of the body portion and the revision or change portion. The latter portion is given a serial number so that revisions and changes are identified. However, the drawing is treated as the same edition if the pre-process has not been completed, and therefore, the same serial number is used even if the drawing is returned.

The worksheet program method aims at performing all handwriting work as it is on the display. Therefore, it is also necessary to accept pre-process, and any record once registered is left as it is in principle. Accordingly,means for identifying the results obtained in the individual operations in pre-processes must be provided. Hence, in the worksheet program method, an updating portion is provided, in addition to the body and the revision portion, for the record and the table index. Although the updating portion has been introduced basically due to the aforesaid reason, the definition of the updating portion is enlarged so that all updating numbers under the same revision number are the same unless otherwise specified, so that individual element tables can be independently changed within in an allowable range from other element tables which constitute a unit table. Plural simulations, studies, and alternative plans can be stored and past revisions numbers can be changed through the introduction of this updating portion.

Next, the document is formally issued from a unit organization after the aforesaid pre-process has been completed, and this issuance procedure is usually done as follows:

(1) A signature denoting permission of formal issue is put on the original by a responsible person.

(2) After the original has been printed, the name of the organizational section, an issue mark with the date, and also, if necessary, a mark denoting the release/status are added. Any document without the aforesaid marks are considered to be an improper or illegal document.

(3) The document is classified and recorded in the document control register which also serves as a distribution ledger, and is then distributed to predetermined places. Distribution to places not determined and the distribution of documents having no formal issue mark are prohibited in principle.

(4) The unit organization which has received the document records this fact to a receiving ledger after classifying the document, and then stores it.

(5) The organization which has issued the document stores the original and a duplicate. Usually, drawing in the manufacturing industry are made on tracing paper which are called originals which must be treated carefully. Whenever a change takes place, the original is modified, printed and distributed. However, an original in terms of its definition that it must maintain the state at a certain moment permanently is not suitable when it is continuously changed to serve as an original. Therefore, the duplicate should be treated as the original, and the original drawing itself should be used as an auxiliary tool for printing the drawings.

(6) Although both the organization which issues the document and that which receives it let the user look at the document or lend it to the user, such an act to others than authorized persons are prohibited. In principle, such looking at the drawings or lending them to an authorized persons is out of the question because unauthorized persons are usually prohibited to enter the room.

From the viewpoint of controlling documents conforming to the aforesaid issuing procedure, an organization can be defined as an organism constituted of a network of units (unit organization=object) having a core composed of an issuing/receiving cell. Therefore, in the worksheet program method, a system is structured around central independent files and the system as integrated by an organic connection of these independent file groups.

The hardware is assumed to have a structure in which files or group-controlled files are provided with a CPU or group-controlled CPU having a file control function, and CPUs having no files and accessing the files via a CPU with a file control function, X-window terminals, and dam terminals.

The system of software is structured in such a manner that the aforesaid files include file registers serving as the top document control register provided for the worksheet program or individual worksheet program softwares.

In the case where there is a system composed of plural unit organizations, any change in a certain document is performed after the original document has been issued, distributed and received. Therefore, the overall system will not have the desired conformability if no means is employed. It is extremely difficult to maintain the conformance of the overall system because of delays in information propagation, propagations induced by continuous changes, and the like.

From the aforesaid viewpoint, the data processing system according to this embodiment is constituted as follows.

In order to make the actual document system applicable to the data processing system, the data structure according to this embodiment is constituted as shown in FIG. 1. That is, the system comprises the three types of tables/lists, that is, the versioned documents, ledger, and document control register. A file register is used to serve as the top document control register, and all of the document control registers including this file register have individual indexes for the versioned documents, ledger, and document control register in the records for their control. The records in the document control register are able to have a parts list address as a classification code in addition to a record index.

All of the control registers except for the file register are able to refer to the versioned documents, ledger, and document control register controlled by its own document control register or by other document control registers. The records in the document control register cannot be changed if it is once registered except when a cancellation or restoration operation is performed.

Furthermore, the records in the document control register have a time stamp for performing time sequential control and further include release (condition for use) and status (state) as control parameters, and also can include the conditions for application. Commands are controlled by the document control register to serve as a kind of versioned documents.

Figure 2:
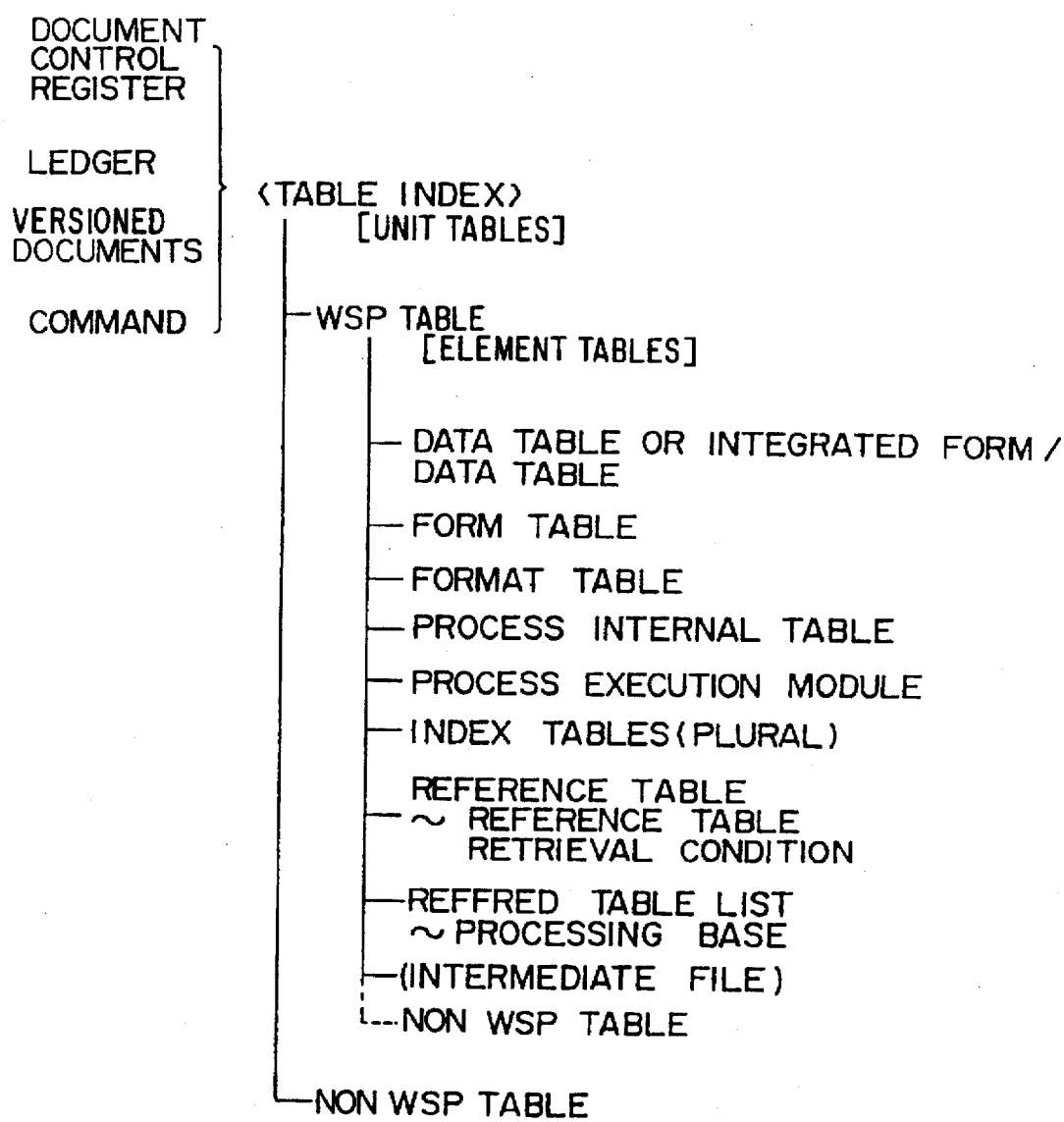
FIG. 2 is a tree which illustrates tables/lists.

The versioned documents, ledger, document control register, and the commands which are units of the above mentioned data structure are structured as shown in FIG. 2. In this case, a single structure is constituted by forming the versioned documents, ledger, document control register, and commands in the same structure as a unit table. This unit table is constituted by one or plural tables which correspond to one or plural types of files. The latter is called an "element table".

The unit table may be either a table peculiar to the worksheet program (WSP table) or an external system table not controlled by the worksheet program (non-WSP table).

Although the WSP table is usually composed of all or some of the tables of the following types, the present invention is not limited to them and other tables can be added if necessary. First, the table is sectioned into a fixed portion and a variable portion each of which can be independently by made into a form table and a data table, respectively, so that overlapping of both external and internal storage area allocation of the fixed portion are prevented, and that a single change of the fixed portion can be effected to all of the unit tables concerned. Also, in order to increase the degree of freedom of the WSP table, the WSP table is constituted of formats which are stored in a format table. The formats in the format table can be made and stored for each external storage area, internal storage area, display, also for each external input and output, and can be added and stored except for those corresponding to the external storage area. Any procedure written by the user is compiled and stored as a process execution module. At this time, a process internal table is simultaneously established for intra-process variables, making the reentry of the process to be possible.

Arbitrary data items in the form table and the data table can be specified, and plural types of their index tables can be possessed. In particular, the ledger and document control register must have an index table with the record index as the key. A reference table can be formed to store the retrieval condition for calling a table for reference required in office work on a unit table. A referred table list can also be formed to record and state clearly the table for reference used for work on the unit table. Although an intermediate file can be formed in order to control a large capacity file, it cannot be stored. Furthermore, a non-WSP table can be included as an element of the WSP table.

The aforesaid unit table (versioned documents, ledger, document control register, and commands) is an imaginary existence composed of plural element tables of plural types existing on a time sequence and unified by the table index, and therefore it does not have a substance. Records in the ledger and document control register also are composed of plural records existing on a time sequence unified by the record index. Therefore, unit tables controlled by the document control register records are a complex of element table groups which are doubly-unified by the record index and the table index.

Such imaginary unit tables (versioned documents, ledger, document control register, and commands) can be realized as a complex substance related by links in the internal storage area only after being retrieved on the basis of such specification as the specification of time, specification of change, specification of release, specification of the status, and so on regarding the user retrieval condition with respect to the record index, the table index, the time stamp, release, status, and the condition of application on the record side. The records of the ledger and document control register can also be made a substance in the internal storage area only after being retrieved similar to the unit table.

As the procedure to make data having the aforesaid structure to become a substance from the file, two data paths, that is, the display series and the command execution series, are made.

Figure 3:
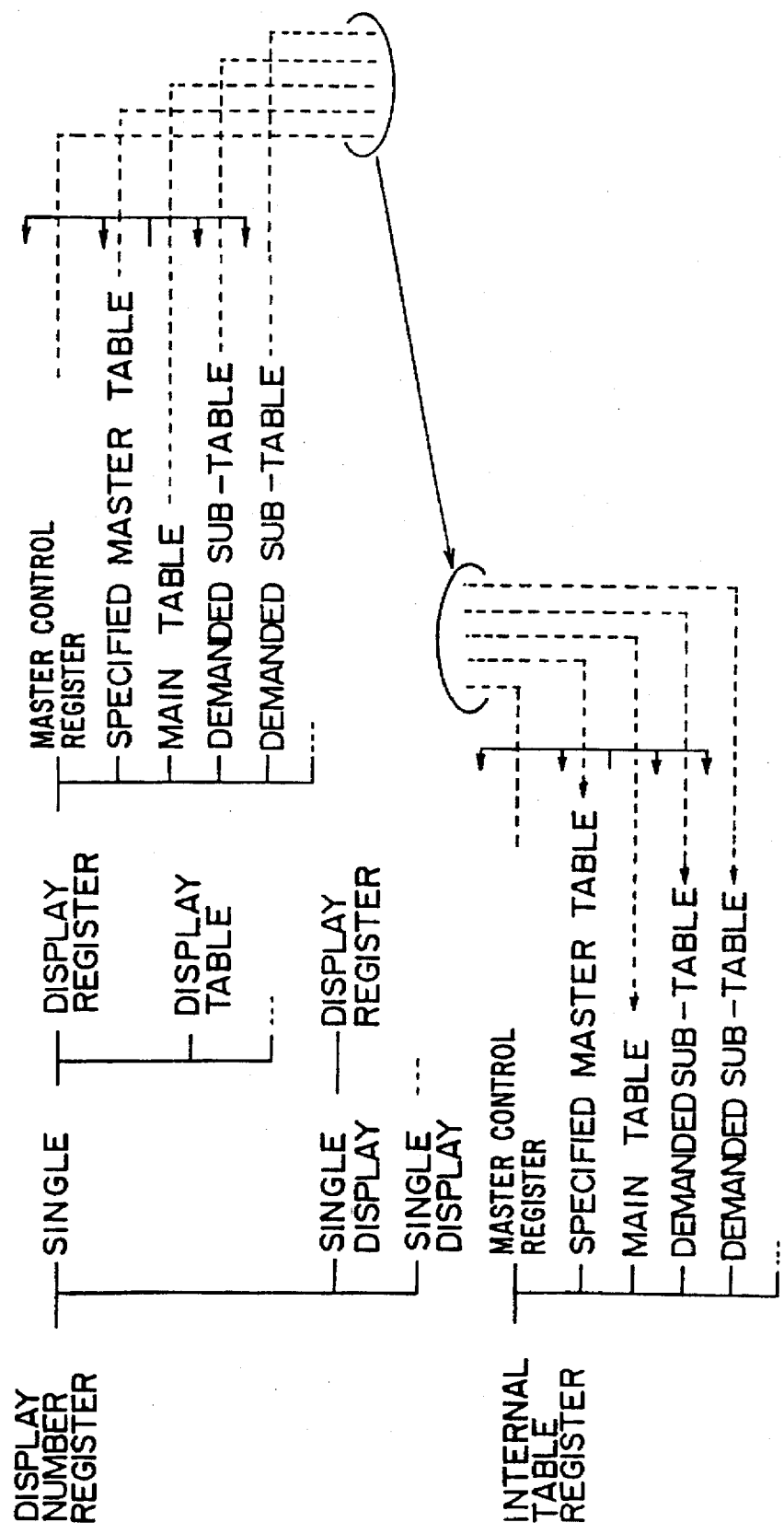
FIG. 3 is a tree which illustrates the structure of a display register and that of an internal table register.

In the display series, each display (hereinafter called a "single display") on the display is controlled by a display number register, as shown in FIG. 3. A single display has specific tables such as a display register and a display table. The display register has a record of the table to be displayed (hereinafter called the "main table"). The record of the main table is linked to the record of the document control register (hereinafter called the "master control register") to which the main table belongs, and to the records of the element tables (hereinafter called the "sub-table") required for displaying or processing. Furthermore, when it is specified that the main table belongs to a certain table, it is linked to the table (hereinafter called the "master table") to which it belongs. Each element table is an independent existence and its role is defined only after it is linked.

Each record of the display register has no substance i.e. the individual records of the display register do not have corresponding element table in the internal storage area but is substituted by being linked to corresponding record of the internal table register.

The relationships among the individual records of the internal table register are the same as those of the display register. However, the individual records of the internal table register are different from those of the display register in that it is able to have substance as an element table in the internal storage area.

As a result of the above structure, one element table in the internal storage area can be commonly possessed between plural single displays having different forms.

Figure 4:
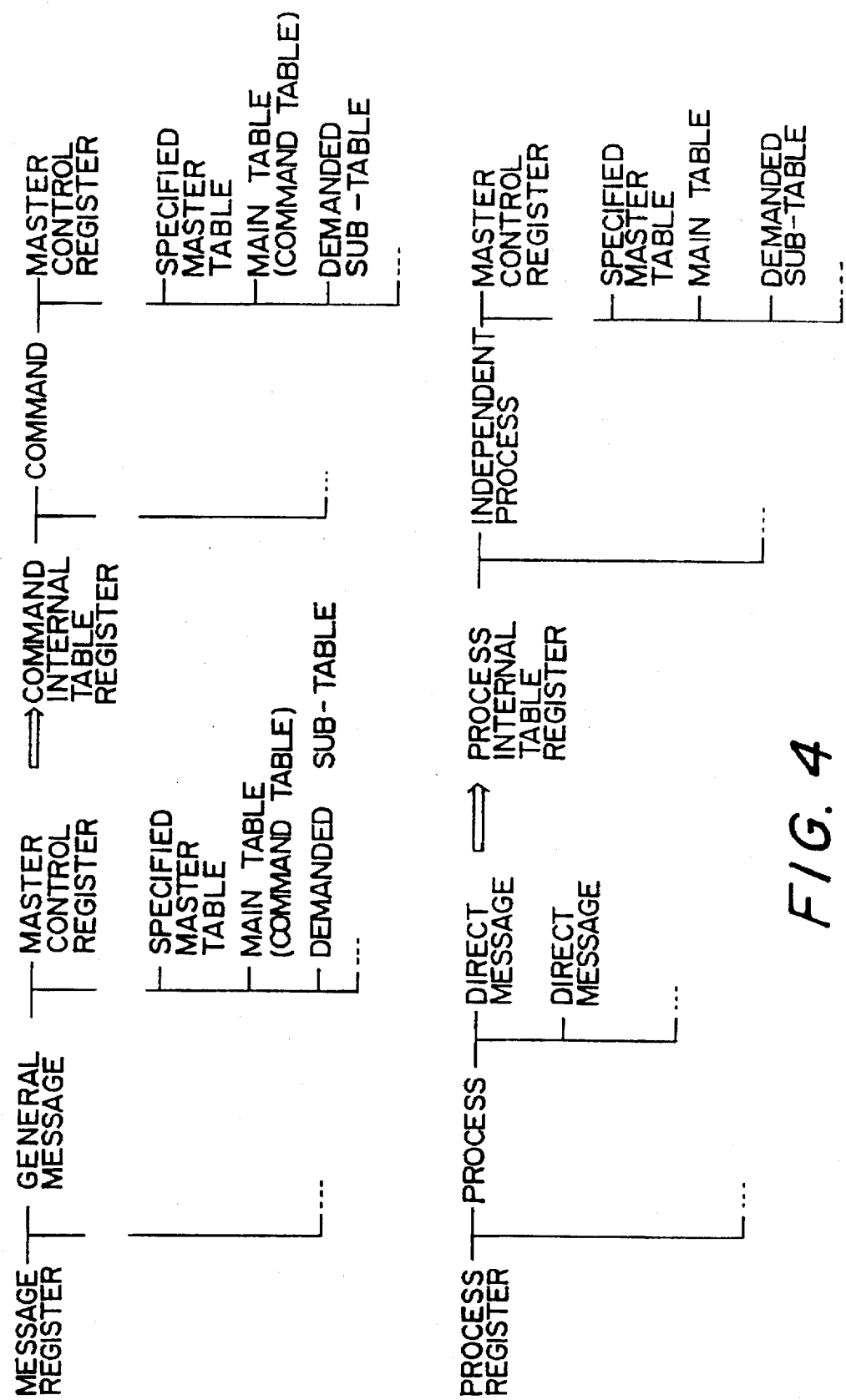
FIG. 4 is a tree which illustrates the structure of a message register and that of a process register.

In the command execution series, commands and independent processes are controlled respectively by a message register and a process register, as shown in FIG. 4.

The demand for a command execution is registered in the message register in the form of a message (hereinafter called a "general message"), and takes the same form as in the display register of having records of the main table, the master control register, demanded sub-table, and specified master table. A command internal table register exists to correspond to the internal table register for displaying. Its relationship with the general message is the same as that between the internal table register for displaying and the display register.

Although the demand for executing an independent process is registered for each process in the process register in the form of a message (hereinafter called a "direct message"), it does not take the form of having plural records, which is different from the display register and a general message. The process internal table register corresponds to the internal table register for displaying, the relationship between it and a message being different from the display register and a general message in that a direct message is linked directly to the process internal table register.

Figure 5:
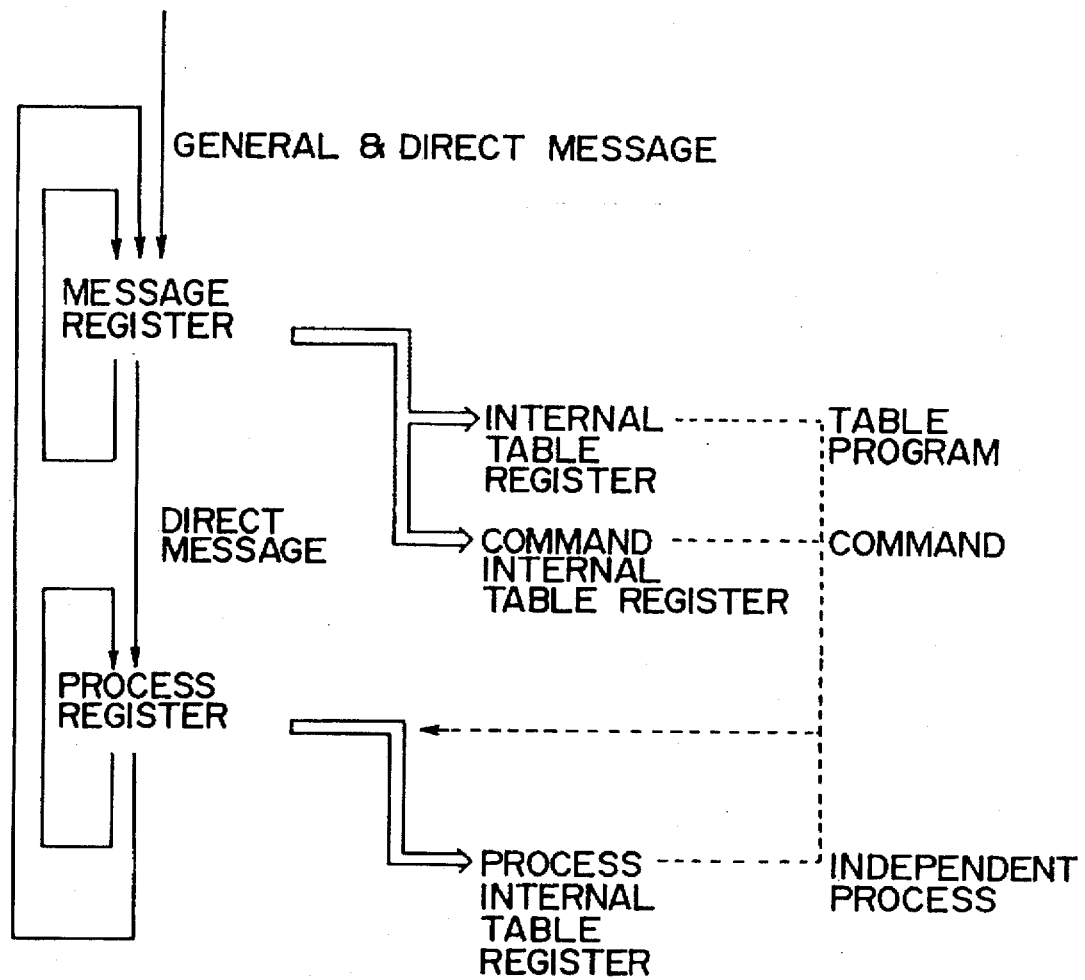
FIG. 5 is a flow chart of the process.

The process of the worksheet program is executed as shown in FIG. 5 and is controlled by the message register and the process register.

The message register edits the orders for the execution of commands and versioned document, ledger, and document control register formed into worksheets so as to be executable by the process register. And an execution module name is given and a direct message is transmitted to the process register.

The process register accepts direct messages for each process, and orders the execution of the process according to priority. A direct message can be returned to the unit which has issued the orders for execution when some result is obtained.

Figure 6:
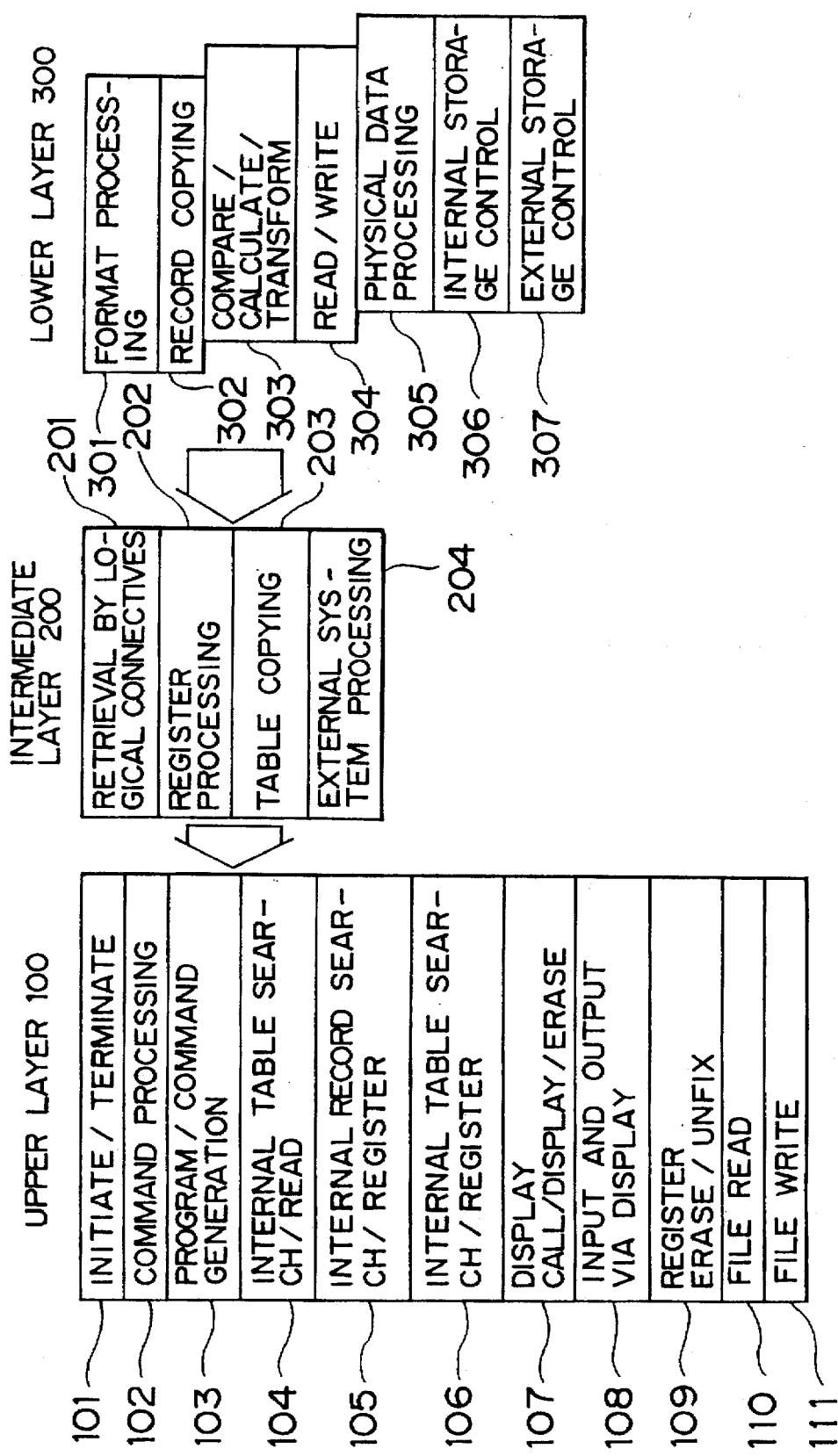
FIG. 6 is a configuration view illustrating a worksheet program.

The process for executing the data processing system having the aforesaid structure is structured as follows:

As shown in FIG. 6, a hierarchy structure is constituted which is composed of an upper layer 100 consisting of program groups corresponding to the various functions for realizing the worksheet program method, an intermediate layer 200 consisting of sub-program groups by which functions required by the program groups in the upper layer are realized, and a lower layer 300 for expanding the language so as to meet the specifications of the worksheet program. The upper layer 100 is constituted of a initiate/terminate means 101, a command processing means 102, a program/command generation means 103, an internal table search/read means 104, an internal record search/register means 105, an internal table search/register means 106, a display call/display/erase means 107, a input and output via display means 108, a register erase/unfix means 109, a file read means 110, and a file write means 111. The intermediate layer 200 is constituted by a retrieval by logical connectives means 201, a register processing means 202, a table copying means 203, and an external system processing means 204. The lower layer 300 is constituted by a format processing means 301, a record copying means 302, a compare/calculate/transform means 303, a read/write means 304, a physical data processing means 305, an internal storage control means 306, and a external storage control means 307.

<<Contents of the Upper Layer>>
<Initiate / Terminate Means 101>

Figure 7:
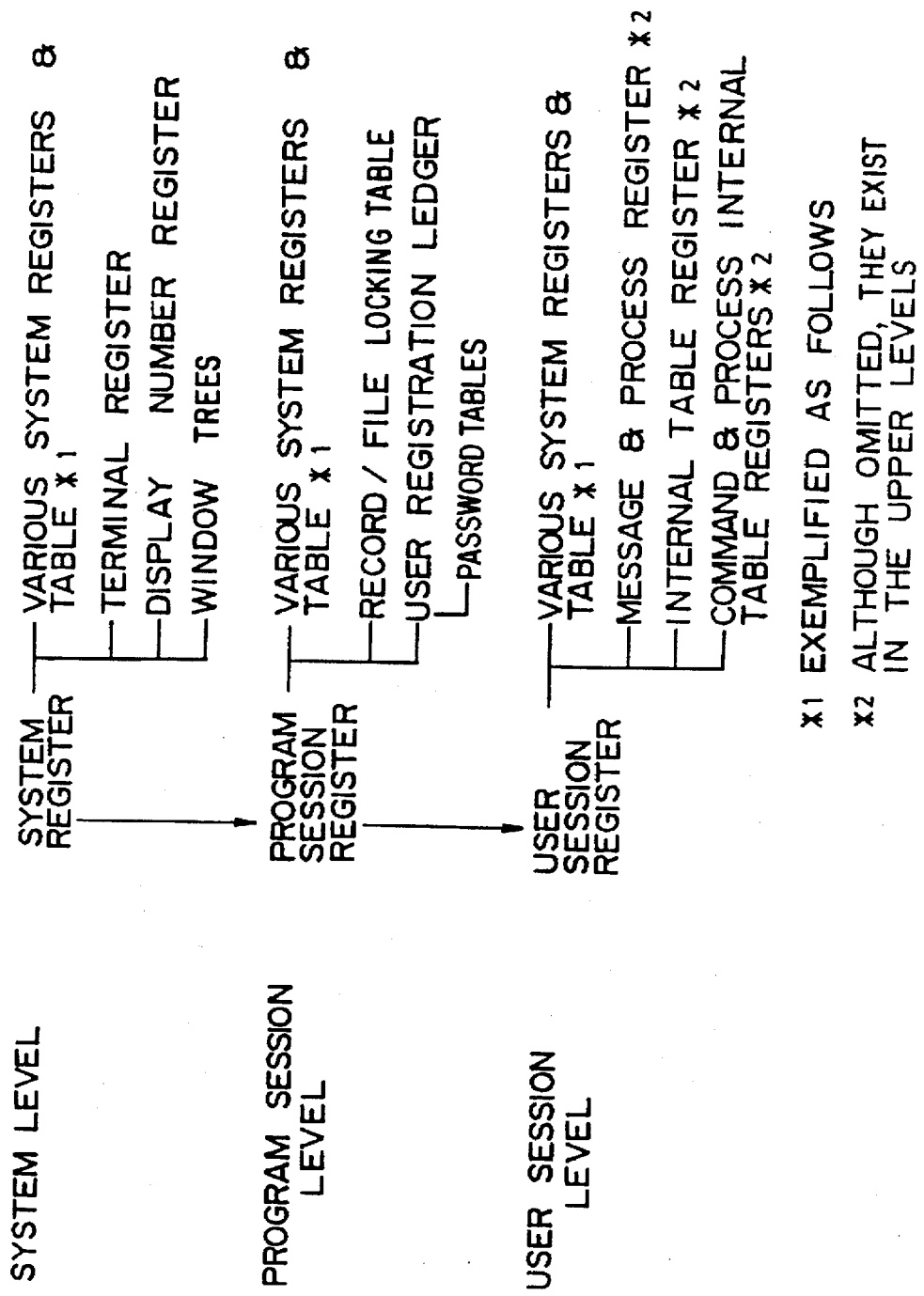
FIG. 7 is a hierarchical view illustrating a system register.

This initiate and terminate means 101 enables the system structure of the document issuing procedure to be realized, and has a control structure composed of the system level, program session level, and user session level, as shown in FIG. 7.

The system level controls the program session, the terminal, and display controlled by its own CPU, and takes the form of registering the program session register, terminal register, display number register, and window tree to the system register. Even when another CPU is used, its terminal must be registered in this system register. A LOG IN display is performed by this session.

The program session level is a session for each software of the worksheet program system which has a corresponding file register and control the user session. It takes the form of registering the user session register, a record/file lock table, user register ledger, and password tables in the program session register. User identification and checking the password is performed by this session.

The user session level is a session corresponding to each user to control the demands of the user in such a manner that various registers are registered in the user session register. In case of access to a file under the control of another CPU, a user session is newly established to access it under the control of this CPU.

An operation of copying a substance for the purpose of bringing a file under the control of another CPU into the control of its own CPU is assumed to be the distribution of a document by means of the distribution ledger and the receipt ledger, and should be controlled accordingly in a similar manner.

It is also possible here to substitute document distribution by establishing a distribution control ledger with which access can be made only by a predetermined unit.

<Command Processing Means 102>

Figure 8:
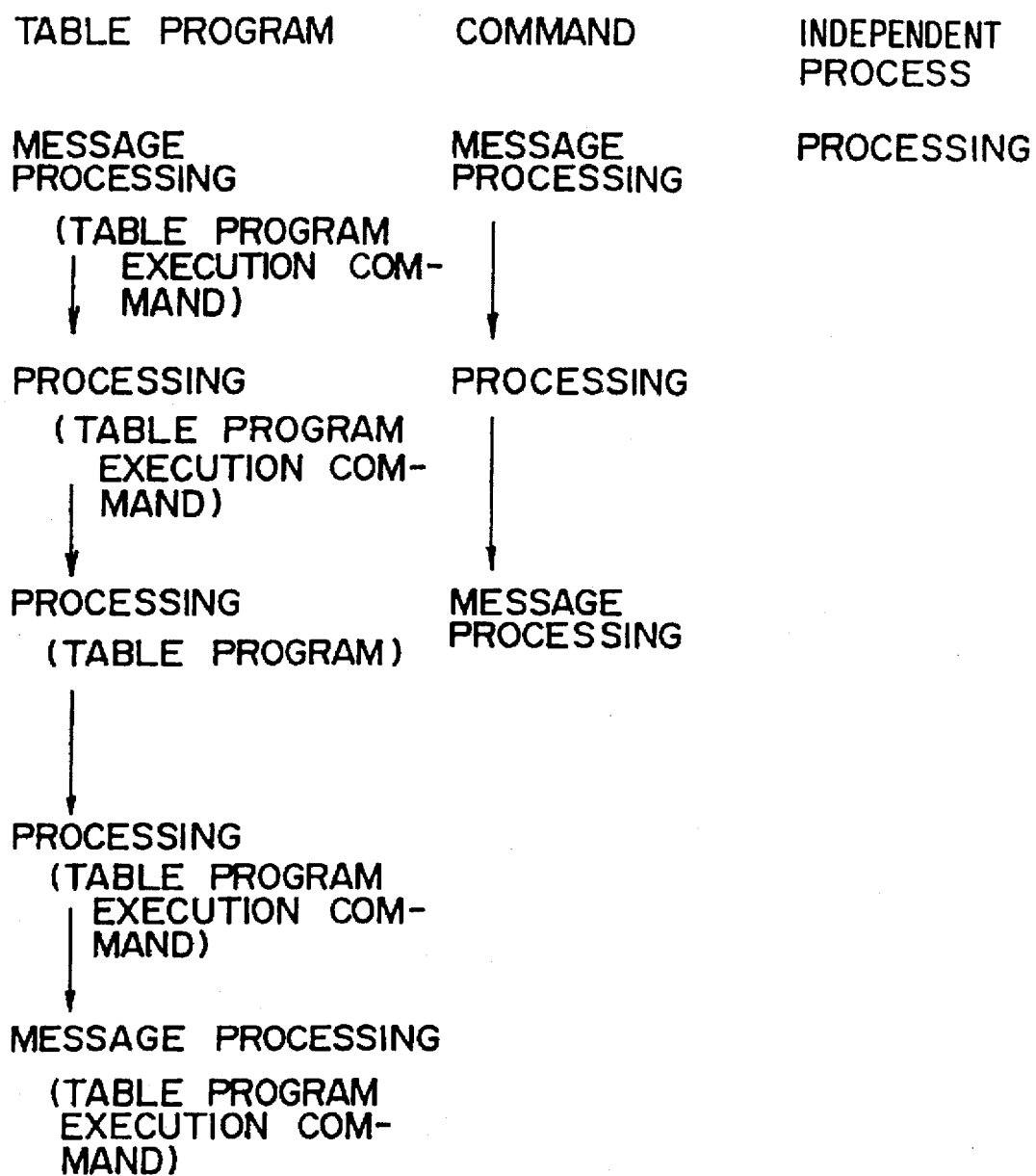
FIG. 8 shows the processing procedure.
Figure 9:
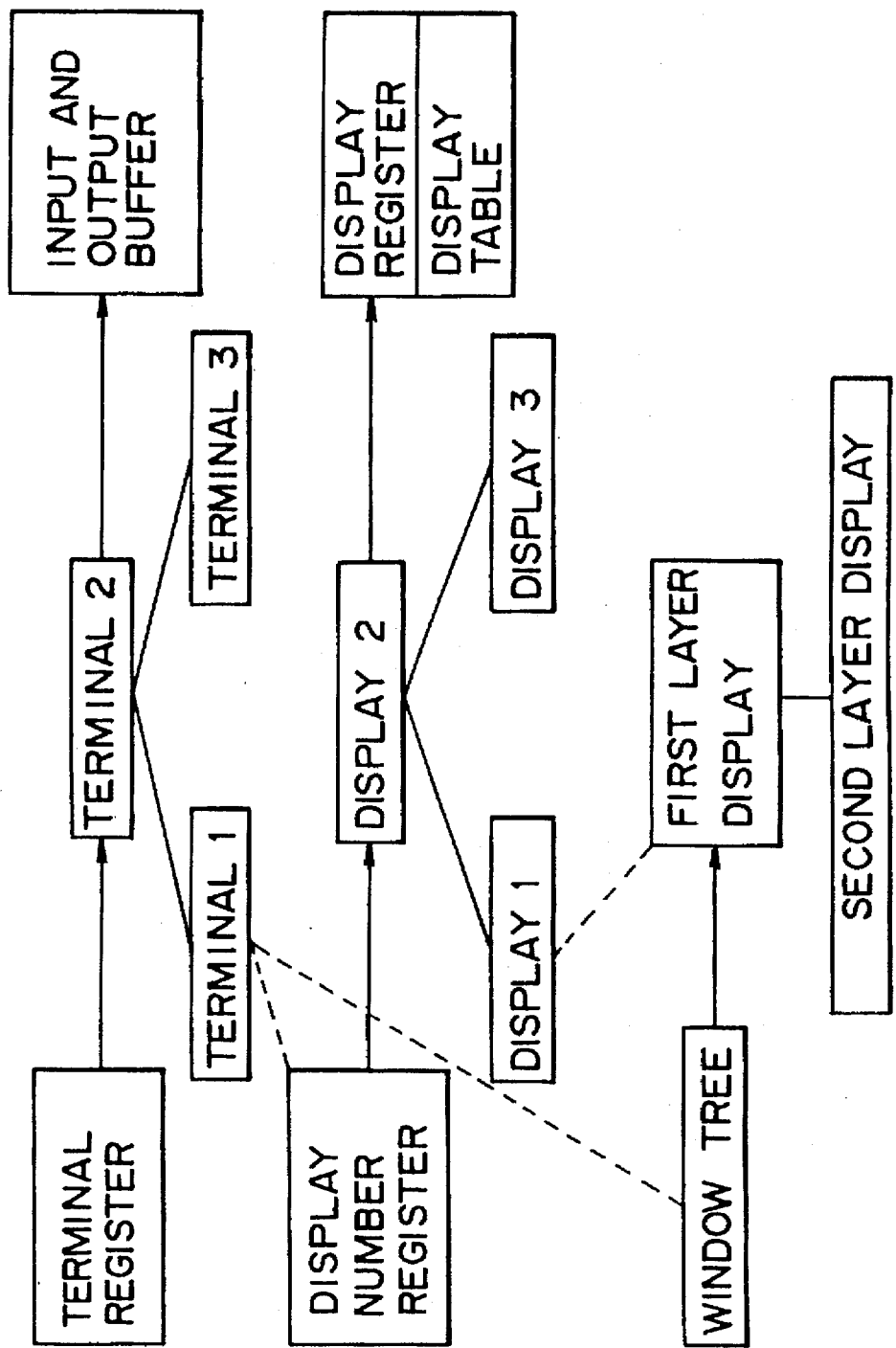
FIG. 9 is a correlation view which illustrates a display relation register.

This command processing means 102 takes the form of carrying out command processing in such a way that independent processes possessing directly by the process register but table programs and commands processing via message processing, as shown in FIG. 8. Here, message processing is established so as to prepare for enabling the command processes to be performed and for carrying out their completion processes, and the details are constituted as follows:

1. Message receipt and register
2. Registering command tables
3. Registering command internal variable tables
4. Writing command parameters
5. Displaying command tables
6. Checking parameters and processing default rules
7. Executing command processes
8. Completion processing <Program/Command Generation Means 103>

The procedure for making table programs and commands are the same, but the difference is that a table program is registered in general document control register and a command is registered in a command document control register.

They are carried out by the following procedure against a program text described by a specified language or worksheet program expression on a form table, integrated form/data table, or command table:

1. Process of analyzing text

Paragraphs of the program text are separated so as to be divided into individual modules, and an analysis tree is made while separating the entry/exit points and detecting any variables.

2. Process of editing text

The program text is made complete by adding entry points definitions, variable definitions and transforming statements, branching point definitions and their control statements, and supplements for various processes on the editing tree based on the analysis tree.

3. The completed text is synthesized by using the editing tree.

4. Compiling/linking is carried out, and process execution modules are made.

5. The internal variable table is generated by using the editing tree.

<Internal Table Search/Read Means 104>

Records or a unit table is composed of plural records or element tables which constitute a time sequential group having the same index body portion (type+serial number). Therefore, the index is made define according to the following various specifications operations such as the specification of time, that of release, that of status, and that of revision and change.

That is, the specification of time is either the latest time, i.e. it has a time stamp of the present or the most recent to the present, or the fixed time, i.e. it has a time stamp of a specified time or the most recent to the specified time. The specification of release is to release at a level equal to or higher than the specified release. The specification of the status is to release at a level equal to or higher than the specified status. The specification of revisions and changes is either the latest version, i.e. with the latest updating among the latest revisions, the specified revision, i.e. with the latest updating under the specified revisions, and absolute specification, i.e. with the specified revision and the specified updating.

The single display and display table, the internal table, and files are made to correspond to the stage in which writing and erasing are performed, the drafting stage and, the fair copy stage. Furthermore, tables not under the control of the document control register are not assumed to be authorized tables. Therefore, records and/or tables must be registered in order to reflect the display inputs in the internal table.

In the internal table search/read means 104, the target table is made define by first completing the index of the target table by the aforesaid index determination, and then, if the internal table has already been made, its pointer is obtained, and if the internal table has not yet been formed, the internal table is made by file input to obtain the pointer, in order to obtain a target table on the internal storage area.

In this case, the index is made definite on the display register having the records of the element tables constituting the display in such a way that the record with conditions meeting the specified conditions of the target table is retrieved. If such a record is detected, it becomes a determined index. If it is not detected, a record meeting the specified conditions of the target table is retrieved from the internal table register controlling the tables in the internal storage area. If it is detected, it becomes a definite index. If such a record is not detected, retrieval is done under the specified conditions of the target table from the document control register of the file.

A table is made define by retrieving a record having the definite index of the target table and marked as having a definite internal table on the display register. If it is detected, it becomes a definite table. If such a record is not detected, the target table is made definite by retrieving a record having the definite index of the target table and having a definite internal table on the internal register. If it is detected, it becomes a definite table. If such a record is not detected, the target table is file-inputted so as to make it an internal table on the internal register.

<Internal Record Search/Register Means 105>

When a record on the display is to be reflected in the internal table, it is specified for each record by a record operation code. This record operation is composed of: list change in which only the record is changed but the table under control is retained as it is, addition, revision, updating, deletion, and restoration which also cause changes in the file; and operation undefined line addition, cancel, blank line addition in which only the records of the internal table are operated.

However, versioned documents are treated in such a manner that unit processing of individual records is not permitted but the whole table is reflected in the internal table. Here, if versioned documents are reflected in the internal table without being done through the document control register records, file cannot output because no operation record will be present in the document control register record although the table will be reflected in the internal table.

The detection of the corresponding internal record is composed of the detection of the record which is originally read from files corresponding to the internal record is composed of the detection of the original record which is read corresponding to the displayed line specified to be operated and previously-written record reflected from the display.

Regarding the generation of the new currently written record, the data items of the displayed table are obtained by selecting the data items of the internal table, so the data items are insufficient. Also, in the worksheet program, writing into an exisiting record is prohibited in principle even for the case of revision or updating. Therefore, the new currently written record is newly copied and synthesized in the sequential order of the corresponding record of the internal table, the display table record, and the specified data items of the specified record, and a tentative record index is given to it. When other records are copied and modified, they are first reflected in the internal table and then modified. When it is specified to have a table under control, if there exist a table to be copied, the table is first made definite and a tentative internal table is generated by a process described later.

If there is a previously-written record, it is deleted. If the previously-written record has a under control table, it is deleted from the internal table register.

<Internal Table Search/Register Means 106>

The process of retrieving and registering the internal table is composed of registration in the register, format processing and generation of the internal table. In the register registration process, tables are registered in the internal table register as being definite. In format processing, the format of a table to be generated is obtained. Although a format can be obtained without making a format table, reading cannot be possible if filing is carried out without a format table. In the internal table generating process, the internal storage area is first allocated, and then a blank table is generated, the table is generated by copying, or the table is generated by synthesizing.

<Display Call/Display/Erase Means 107>

Since a display is independent from the internal table as described previously, the internal table must be read into that of the display level before being displayed. In the display process, communication with the terminal window system is carried out via a buffer. However, a simple window system is additionally provided as a measure taken against the case where a window system does not exist or is unsatisfactory.

Display calling, displaying, and erasing are performed in such a manner that a terminal register accomodating all the terminals controlled by its own CPU is provided, and an input and output buffer is provided for each terminal. Furthermore, a display number register accomodating all the single displays on the terminal is provided for each terminal, and a display register and a display table are provided for each single display. At the same time, a window tree denoting all overlappings of single displays on the terminal is provided for each terminal.

Displaying is done by newly constituting or re-constituting the internal table obtained from the display register in the display table of the single display detected or newly registered in the display number register.

Displays are categorized into a full display for displaying as it is, clear display for displaying a cleared display, and a non-display in which nothing is displayed.

<Input and Output via Display Means 108>

This input and output via display means 108 consists of a display input portion and a display output portion. And the display input portion is constituted of a display table input portion, a display operation portion, and a command processing portion.

In the display input portion, the input in the buffer is pre-processed, and then it is classified sent to the display table input portion, display operation portion, or command processing portion. The display table input portion reflects the input to the display table, the display operation portion processes operations to the display to improve the response, and the command processing portion makes a message and sends it to the message register.

The display output portion outputs all or a portion of the display table to the buffer and transfers to the terminal after pre-processing.

<Register Erase/Unfix Means 109>

Figure 10:
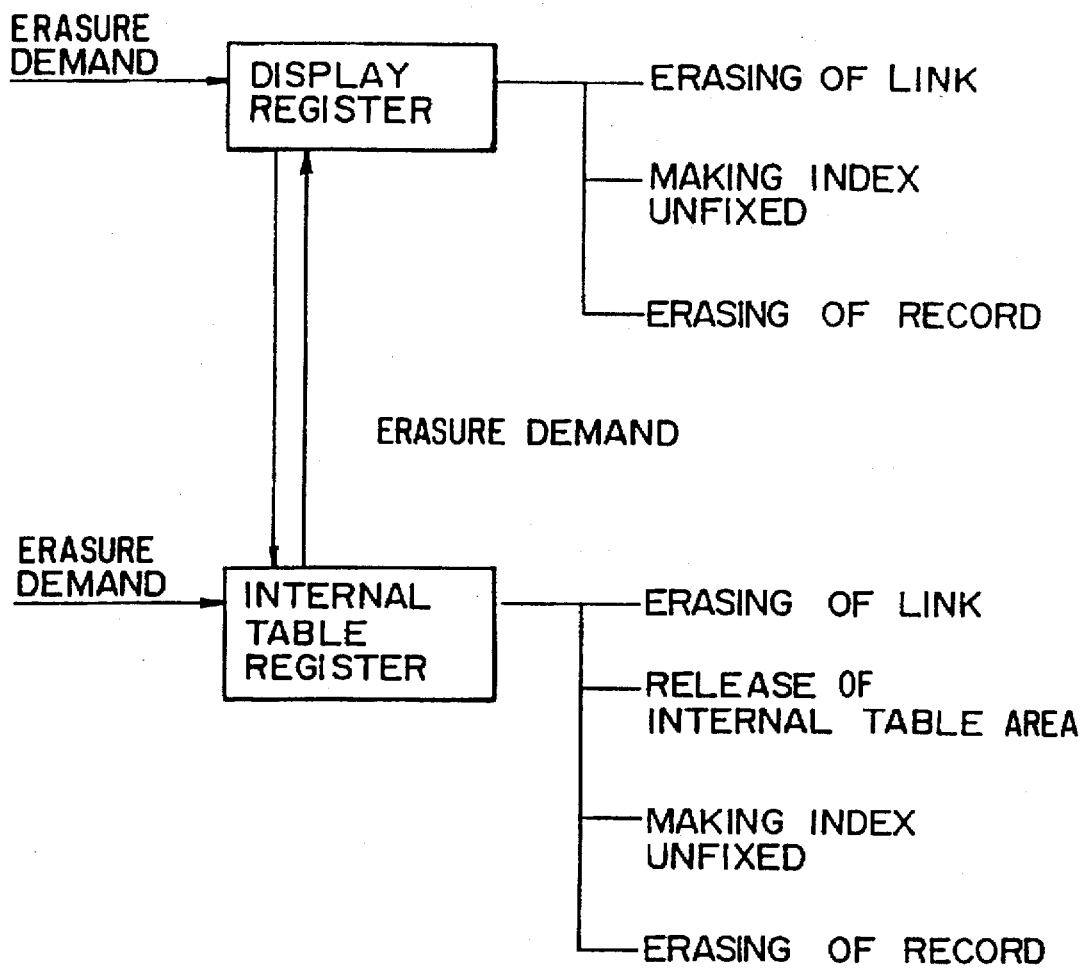
FIG. 10 illustrates the process for erasing and making unfixation in a register.

As shown in FIG. 10, a request for deleting the whole display register or each record of the display register, and a request for deleting each record of the internal table register must be processed by relating them to each other.

Processing in the display register is either link deletion, index indetermination, or record deletion or any combination of them. Processing in the internal table register is either link deletion, internal table deletion, index indetermination, or record deletion or any combination of them. At this time, the propagation of the process of a certain record to other records cannot be prevented.

Here, the term "indetermination" means to return an index determined or made definite by the aforesaid internal table search/read means 104 to an indetermined or unfixed state.

<File Read Means 110>

First, file access is provided with the two types of steps of the step of reading and writing a file in table units typified by table determination and the step of reading and writing a file in record units typified by the index determination. Record/file locking consisting of logical locking by using the specifications of the worksheet program are performed as follows in order to enable plural users to access the same table simultanuously at the aforesaid reading and writing operations:

(Read Locking)

At the time of reading, locking is realized by locking in table units using retrieving condition for reading. In either reading in table units or in record units, locking under the retrieval condition is effected for the whole table.

(Write Locking)

At the time of writing, only the records which are the object of writing are locked in the ledger and the document control register. In versioned documents, the all of the tables which are the object of writing are locked, because versioned documents are assumed to be a subordinate table under the control of the document control register record. Here, the cases of generation, revision, updating, deletion, or restoration of the whole ledger or document control register, the ledger and the document control register are treated similarly to versioned documents. However, all records having the same index body (type+serial number) are locked as well as the record which is the object of writing in the case of the deletion and restoration.

(Checking)

At the time of file access, retrieval is performed on the record/file locking table, compare the locking condition and the retrieval condition so as to judge whether access can be made or not. If a record of the file has conditions for application, it must be judged whether file access can be made or not at the stage of checking or retrieval.

File input processing is composed of pre-processing, procedure setting, file reading, and post-processing and is carried out under the aforesaid locking condition.

1. Pre-processing

Record/file locking is done after confirming that the password record in the password table for each user permits access under the present retrieval condition.

2. Procedure Setting

In case there exist index tables, the table which meets the present retrieval condition is selected. If an intermediate file is required, it is prepared.

3. File Reading

After retrieving the record as specified, reading in record units or table units is performed. If the detected record has some condition for application, a judgement is made at this time.

4. Post-processing

The access counter of the document control register records controlling the tables to which access was made is increased by one, and the record/file is unlocked.

<File Write Means 110>

The ledger and the document control register are output to the file in record units, while versioned documents are output to the file in internal table units under the control of the document control register record.

1. Previous Pre-processing

After confirming that the password record in the password table for each user permits access for file writing under the present retrieval condition, the record/file locking process is carried out.

2. File Writing

The record is formed to meet the file specification, and confirmation is made that the password record permits the file output of the record. Then, writing into the file is carried out. If the record has conditions for application, judgement is made.

3. File Post-processing

If there are index tables and/or intermediate files to be processed, they are updated. Furthermore, the record/file is unlocked after the items described below have been completed.

4. Post-processing of the Internal Table

As for the internal tables in its own user session, insertion, rewriting, deletion, indetermination, and tentative index normalization are carried out corresponding to the outputs of the records of the ledger and the document control register or the outputs of the document control register record and versioned documents, so as to maintain conformance with the files.

5. Change Message

A change message is sent to other user sessions in its own program session. The session which has received the message checks the presence of any influence. Updating is performed if necessary.

<<Contents of the Intermediate Layer>>

The intermediate layer is a kind of a library for programs of the upper layer, and is composed of retrieval by logical connectives, register processing for processing the register shown in FIG. 7, table copying for copying in table units, and external system processing which is interfacing with the other applications other than the worksheet program.

<Retrieval by Logical Connectives Means 201>

Comparison/evaluation of a variety of conditions such as register retrieval, index determination, and record/file locking is the base of the worksheet program. Therefore, retrieval by logical connectives is provided in which texts described by logical connectives are processed in interpreter form. Its functions are as follows:

1. Detection of Records
2. Detection of Data
3. Evaluation of Retrieval Condition by Using Record Data Values
4. Comparison of Retrieval Conditions
5. Multistage Interpolation <Register Processing Means 202>

Since the series of registers in the worksheet program is complicated, register processing is divided into the following three stages to simplify processing:

1. System Register Processing

Initialization/deletion of the system registers/tables and address return are performed.

2. Retrieval of Register Record

The means for retrieving the records of the system registers/tables is given.

3. Register Data Processing

The procedures for treating the individual data items in the system registers/tables are given.

<Table Copying Means 203>

The internal table must be copied or synthesized in the processes to be performed by the internal table search/read means 104 and by the internal table search/register means 106 in the upper layer. The means for realizing the aforesaid requirements while meeting the restrictions are given here.

Here, synthesis means to generate a new table modifying the specified base table by using a predetermined model table for all or a portion of element tables such as the form table, data table and format table.

<External System Processing Means 204>

The worksheet program permits a non-worksheet program table as an element table, and a procedure is provided for such treatment by this external system processing means.

A non-worksheet program table is, in principle, in the worksheet program, operated in the world of the application software to which it belongs, but the following processes are operated from the worksheet program side from the requirement of document control.

1. Start/Completion of External System
2. Retrieval/Reading of External System Tables
3. Release of External System Tables
4. Generation/Copying of External System Tables
5. Display/Erase of External System Displays
6. Writing/Deletion of External System Files <<Contents of Lower Layer>>

The lower layer is composed of module groups for extending the language so as to meet the specification of the worksheet program as described previously. In order to permit variable length and the variety of character types and numeric types at the time of processing records, a format in which the data type of the record is described is always used together.

<Format Processing Means 301>

The format has three hierarchical layers, that is, format table, current format, and data specification to provide flexibility.

1. Format Table

This is a table having the file format, internal table formats, the display formats, and external input and output formats for each element table in the form of records. Plural formats can be made except for the file format.

2. Current Format/Current Format Table

These are formats extracted from the format table and effective at the present time or a table constituted of them. Record processing is performed with this current format.

3. Data Specification

The format has, for each data item, format symbols, sequence order within records, data type, sorting condition, data area condition, displaying condition, and retrieval condition as data specifications.

<Record Copying Means 302>

In the worksheet program, display tables, the internal tables, and files are treated as individual components, and therefore conversion among them and editing is necessary. Furthermore, editing from plural records is also carried out, as described in the search/register means 105 of the internal record. However, the addition/deletion/updating of data items cannot be done in a simple manner due to having variable lengths. Therefore, a work record is provided for each data item under a binary tree so as to generate records in the following procedure:

1. In the case where an original record exists, it is read into the work record.

2. The sender record is read into the work record transforming by using the data specification of the aforesaid format.

3. The work record is written out into the receiver record.

<Compare/Calculate/Transform Means 303>

Comparison, calculation, and transformation of data is performed in four stages, that is, reading/writing, modifying process, transformation, and comparison/calculation. However, an arbitrary hierarchy can be used as the entry point.

1. Reading/writing

The data and data specification are read from the outside, or data is written outside according to the given data specification.

2. Modifying

The modifier of the data is removed or modifying is processed to transformed data.

3. Transformation

Data from which modifiers have been removed is transformed into a standard form, or calculated data is transformed into an output form. This is the last stage in the case of simple transformation.

4. Comparison/Calculation

Comparison or calculation is performed by using the transformed data. In the case of comparison, output is made in this hierarchy.

<Read/Write Means 304>

The following four types of processes are provided as the procedure for writing in data units according to the given data specification:

1. Writing as it is

Data is written on a given existing data area.

2. New Writing

Data is written while newly acquiring data area.

3. Writing on Work

Data is written while taking the work record for each data.

4. Writing from Work

Data is written from the work record while sequentially acquiring data area.

<Physical Data Processing Means 305>

This is processing storage area to allow a variety of variable length character types number types. Two types of and various character types and numeric types. Two categories physical data types, that is, the table type and the work type, are used in principle. The physical data processing system gives a procedure for performing the aforesaid physical data processes.

1. Table Type

Figure 11:
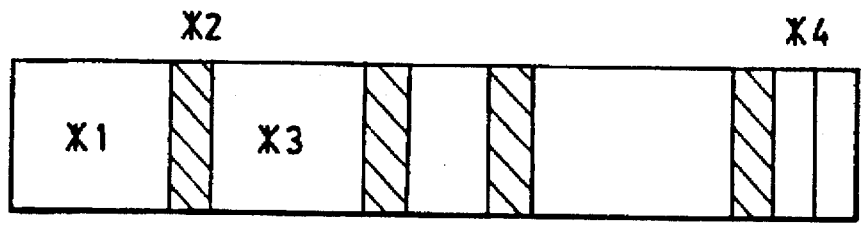
FIG. 11 illustrates the data structure for table types and work types.
Figure 11:
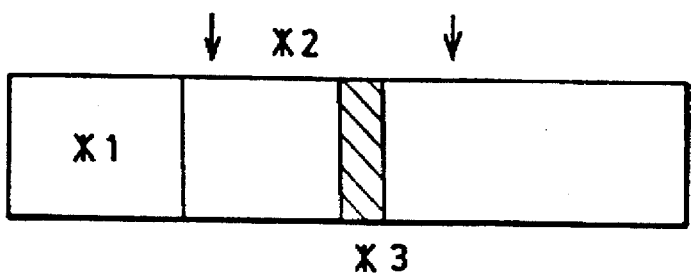

As shown in FIG. 11 (1), the table type is arranged to accommodate data in-between EODs (Ends of Data) denoting the boundaries of data, and has an EOR (End Of Record) denoting the end of a record. The table type is the basic form of data in the worksheet program.

2. Work Type

As shown in FIG. 11 (2), the work type has an EOD only in a specified case, and the data position is indicated by a pointer. It is, in principle, used as an intermediate form in the worksheet program.

<Internal Storage Control Means 306>

Figure 12:
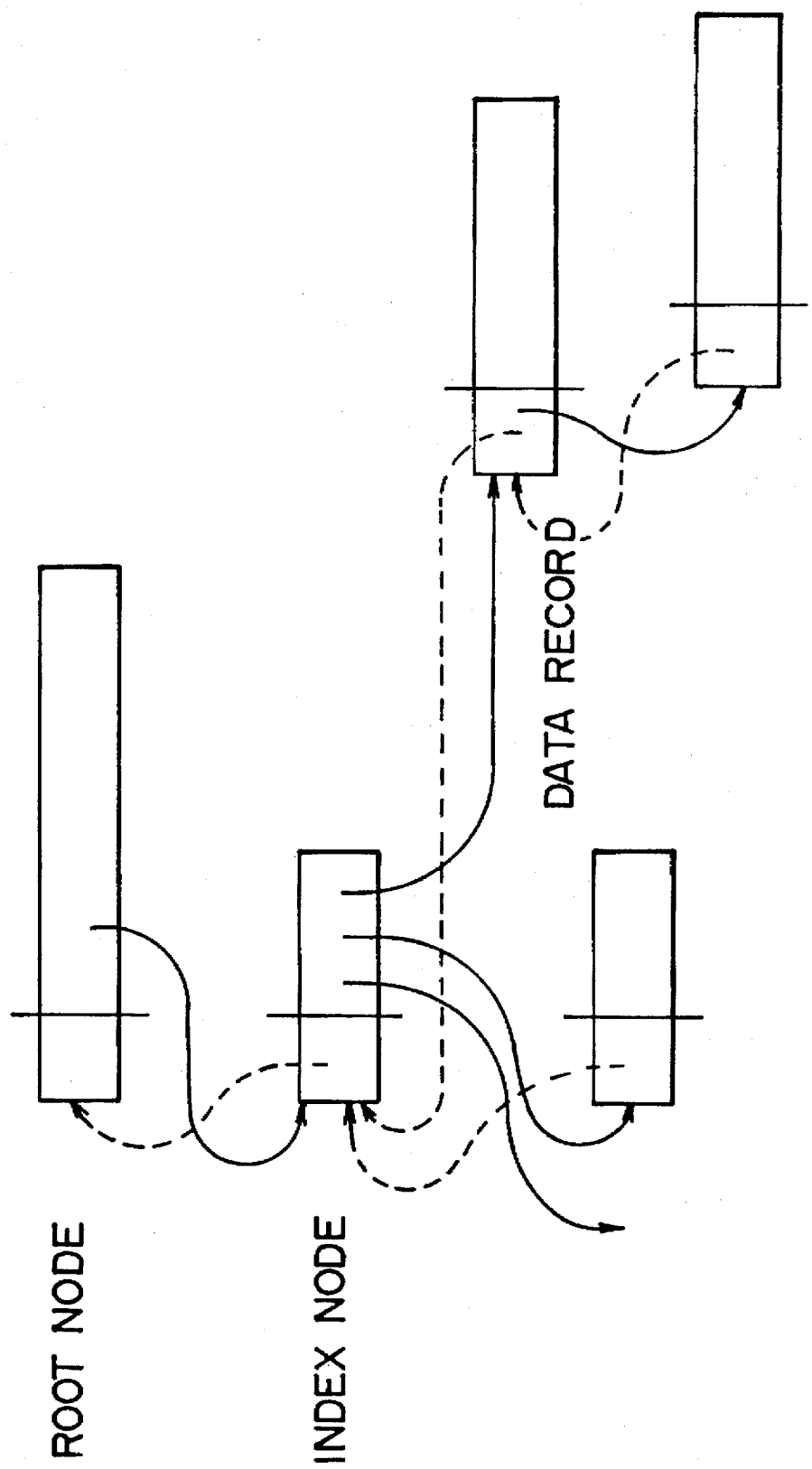
FIG. 12 illustrates internal strage area control.

In the internal storage area, a table is expressed as an aggregation of data records controlled by a binary tree, as shown in FIG 12. Storage control provides the procedure of this process.

1. Root Node

This root node represents a table and stores data for internal storage control.

2. Index Node

This represents a record and has pointers for pointing to lower index nodes and data records under its control.

3. Data Record

This is the body portion of a record and is composed of a plural fixed length strage areas connected by pointers.

<External Storage Control Means 307>

Figure 13:
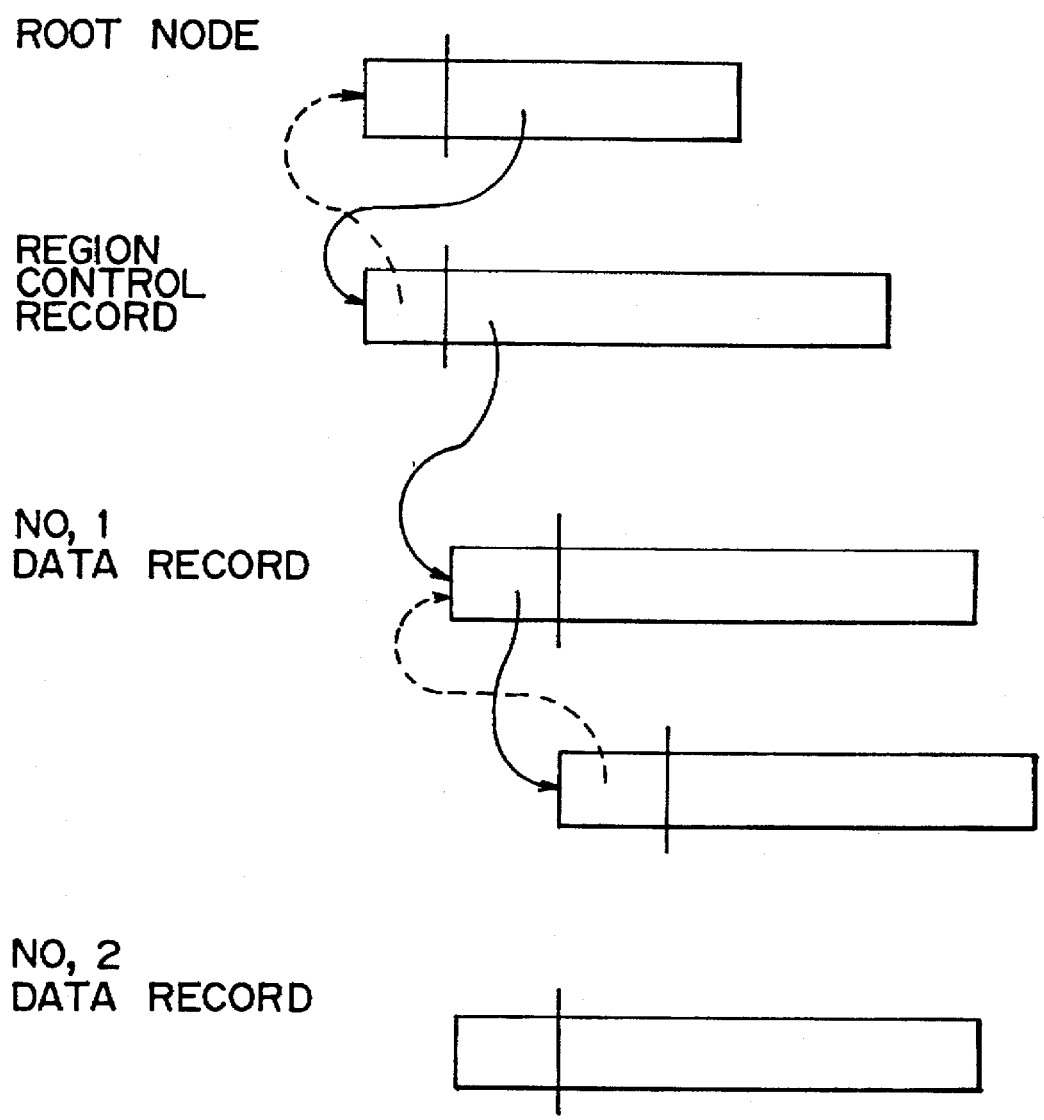
FIG. 13 illustrates external storage area control.

A table in the external storage area is expressed as an aggregation of data records in the order of the acquired storage area and order of records in the acquired storage area, as shown in FIG. 13. The index table is expressed in a form having pointers for pointing to the lower index nodes in the data record. This external storage control provides the procedure for this process.

1. Root Node

The root node represents a table and stores data for external storage control.

2. Storage Control Record

This has data on the head pointer for the acquired storage area and other data, and controls the data records.

3. Data Record

Each data record is constituted by plural fixed length storage areas connected by pointers. These data records have a record mark at the head of their storage area, and they are sequentially stored from the head portion of the acquired storage area.

I claim:

1. A data processing system utilizing a computer process, the system comprising:

a plurality of document control registers, wherein each document control register comprises at least one of:
versioned documents, wherein each versioned document is a confined and comprehensive type of tables/lists maintaining initially inputted data,
at least one ledger, wherein a ledger is a table/list maintaining data having variable input information, and
at least one other document control register, wherein a document control register is a kind of a ledger,
wherein each said document control register has indexes for identifying and controlling records and the versioned documents and ledger that are the object of control, each said document control register having indexes for referencing the versioned documents, said ledger and said document control register when controlled by at least one of said document control register and other document control registers, said document control register having a change control portion for records, said versioned documents, said at least one ledger, and said at least one other document control register that are the object of control, and a portion for controlling use conditions and a state of the records, said versioned documents, said at least one ledger and said at least one other document control register that are the object of control, said document control register enabling access to all the versioned documents concerned; and an internal table register mechanism for finding, by searching only said plurality of document control registers and only upon receiving a request, specified ones of plural versioned documents, ledgers, document control registers and records with a same index and stored in an external storage device, for transferring the specified ones to an internal storage device, and for relating elements of the specified ones together by links if the specified ones comprise plural elements, wherein said links are temporary.

2. A data processing system according to claim 1, wherein each of said versioned documents, said at least one ledger, and said plurality of document control registers and commands, wherein each command is a kind of versioned document, comprises a unit table comprising at least one of:

an integrated form/data table for storing data for said unit table, a form table for storing fixed portions of the data of said unit table, a data table for storing variable portions of the data of said unit table, a format table for storing formats of said unit table, a process execution module for executing processing procedures of said unit table, a process internal table for storing internal variables used during execution of the processing procedures of said unit table, plural index tables composed of arbitrary data item groups for retrieving unit tables, a reference table for storing retrieval conditions for calling tables for reference, a referred table list for recording used tables for reference, an intermediate file for processing large-capacity files, and a storage portion for storing additional tables.

3. A data processing system according to claim 1, wherein said document control register has:

a portion for accepting classification numbers of users, distinguishing between new record generation, record revision, record updating, record cancellation, and record restoration for controlling changes in records of said document control register and said tables/lists that are the object of control, and having a time stamp for controlling the time sequence, and a portion for possessing information on purpose of usage, states, and conditions for application, wherein the document control register comprises record groups that can not be changed except when specially instructed by a user to be canceled or be restored.

4. A data processing system according to claim 1, wherein said tables/lists constituting said versioned documents, said at least one ledger, and said plurality document control registers have individual or plural specified formats for individual external storages, internal storages, displays, and external outputs, and furthermore said tables/lists have freely specified formats for individual data items, data forms, and display forms for individual users and formats for arbitrary retrieval, include data processing procedures by commands or programs, and are constituted to enable plural tables/lists to be connected and operated together.

5. A data processing system according to claim 1, further comprising:

a command internal table register mechanism for commands that are a kind of said versioned documents, a process internal table register mechanism for independent processes that are a kind of said versioned documents, a display register mechanism for relating said elements comprising said tables/lists that are the object of processing to one another by links and for relating said elements to those controlled by said internal table register mechanism, a message register mechanism for relating said elements constituting messages that are orders for execution to one another by links, for relating said elements to those controlled by said command internal table register mechanism, for editing said commands, said versioned documents, said ledger, and said document control register that have procedures to enable them to be processed, and for sending them to a process register mechanism, the process register mechanism for relating direct messages that are processing commands to a processes which are the processing procedures, for relating them to those controlled by various internal table register mechanisms, for making the individual processes process said direct messages, and for returning results to one of the process register mechanism and other mechanisms, and a display mechanism including a display number register mechanism for controlling individual displays and a display table mechanism, display register mechanism, and an auxiliary mechanism for displaying.

6. A data processing system, comprising:

a plurality of records, wherein each record comprises at least one of:

a plurality of stored documents, each document having at least one independent document version, each independent document version fixedly maintaining data of the independent document version as initially stored;

table means for maintaining variable input information; and other ones of the plurality of records; and document control table means for identifying at least one of the plurality of stored documents, the table means and other document control tables and for performing control procedures, and comprising at least one of:

a record index for identifying the other ones of the plurality of records, a table index means for identifying the table means, at least one document index for referencing the plurality of independent document versions, a change control portion for controlling the other ones of the plurality of records and the table means, and a condition control portion for controlling at least one of record states of the other ones of the plurality of records, table states of the table means, and use conditions for the independent versions to enable access to each independent document version; and an internal table register means for finding specified ones of said records with a same index and stored in an external storage device, by searching only said document control table means and only when retrieval is requested, for transferring the specified records to an internal storage device, and when said record comprises a plurality of elements, for relating said plurality of elements together by links, the links determined based on conditions existing upon retrieval and the links being only temporary.

7. The data processing system of claim 6, further comprising a plurality of commands, each of the plurality of commands being a type of stored document and being controlled by a document control table means.

8. The data processing system of claim 7, wherein each of the plurality of records has a unit table structure, the unit table structure for each one of the plurality of records comprising at least one of:

data table means for storing variable data;

integrated data/form table means for storing variable data and fixed data;

form table means for storing fixed data;

format table means for storing formats;

process internal table means for storing internal variables used during processing of processing procedures of said unit table;

process execution module means for processing the processing procedures of said unit table;

at least one index table means for storing arbitrary data item groups for retrieving tables;

reference table means for storing retrieval conditions calling for tables for reference;

referred table list means for identifying the retrieved tables for reference;

intermediate file means for processing large capacity files; and non-system unit table means for storing non-system unit tables.

9. The data processing system of claim 7, wherein each of the plurality of records has a unit table structure, the unit table structure for each one of the plurality of records comprising one of a system table means and a non-system table means.

10. The data processing system of claim 6, wherein each of the plurality of records has a unit table structure, the unit table structure for each one of the plurality of records comprising at least one of:

data table means for storing variable data;

integrated data/form table means for storing variable data and fixed data;

form table means for storing fixed data;

format table means for storing formats;

process internal table means for storing internal variables used during processing of processing procedures of said unit table;

process execution module means for processing the processing procedures of said unit table;

at least one index table means for storing arbitrary data item groups for retrieving tables;

reference table means for storing retrieval conditions for calling tables for reference;

referred table list means for identifying the retrieved tables for reference;

intermediate file means for processing large capacity files; and non-system unit table means for storing non-system unit tables.

11. The data processing system of claim 10, wherein said unit table structure has individual or plural specified formats for individual external storages, internal storages, displays, and external outputs, and furthermore said unit table structure has freely specified formats for individual data items, data forms, and display forms for individual users and formats for arbitrary retrieval, include data processing procedures by commands or programs, such that a plurality of said unit table structures are enabled to be connected and operated together.

12. The data processing system of claim 6, further comprising:

command internal table register means for commands, the commands being a type of stored document, process internal table register means for independent processes, the independent process being a type of stored document, display register means for relating said elements that are the object of processing to one another by links and for relating said elements to those controlled by said internal table register means, message register means for relating said elements forming messages that are orders for execution to one another by links, for relating said elements to those controlled by said command internal table register means, for editing said commands, and said records that have procedures to enable them to be processed, and for sending them to a process register means, the process register means for relating direct messages that are processing commands to processes which are the processing procedures, for relating them to those controlled by various internal table register means, for making the individual processes process said direct messages, and for returning results to one of said process register means and other of said means, and display means including display number register means for controlling individual displays and display table means, display register means, and auxiliary means for displaying.

13. A data processing system, comprising:

a plurality of versioned documents, each versioned document fixedly storing a data set as initially input into the data processing system;

a plurality of ledgers, each ledger storing at least one variable data set;

a plurality of document control registers, each controlling at least one of other ones of the plurality of document control registers, at least one of the plurality of versioned documents, and at least one of the plurality of ledgers; and an internal table register mechanism for finding, by searching only the plurality of document control registers and only when retrieval is requested, specified ones of the plurality versioned documents, the plurality of ledgers, the plurality of document control register, and records having a same index in an external storage device, for transferring the specified ones to an internal storage device, and, when said record comprises a plurality of elements, for relating said plurality of elements together by links, the links determined based on conditions existing upon retrieval and being only temporary;

wherein each said document control register comprises individual indexes for the at least one versioned document, the at least one ledger and the other document control registers controlled by said document control register, and each document control register which is controlled by another document control register is capable of referencing each of the plurality of versioned documents, each of the plurality of the ledgers and each document control register which is controlled by another document control register, such that access to each versioned document is enabled.

14. The data processing system of claim 13, further comprising a plurality of commands, each of the plurality of commands being a type of a versioned document and being controlled by one of the plurality of document control registers.

15. The data processing system of claim 14, wherein each of the plurality of versioned documents, the plurality of ledgers, the plurality of documents control registers and the plurality of commands has a unit table structure, the unit table structure for each one of the plurality of versioned documents, the plurality of ledgers, the plurality of documents control registers and the plurality of commands comprising one of a system table and a non-system table.

16. The data processing system of claim 13, wherein each of the plurality of versioned documents, the plurality of ledgers, and the plurality of documents control registers has a unit table structure, the unit table structure comprising at least one of:

a data table;

an integrated data/form table;

a form table;

a format table;

a process internal table;

a process execution module;

at least one index table;

a reference table;

a referred table list;

an intermediate file; and a non-system unit table.

17. The data processing system of claim 13, wherein the unit table structure has individual or plural specified formats for individual external storages, internal storages, displays, and external outputs, and furthermore the unit table structure has freely specified formats for individual data items, data forms, and display forms for individual users and formats for arbitrary retrieval, include data processing procedures by commands or programs, such that a plurality of said unit table structures are enabled to be connected and operated together.

18. The data processing system of claim 13, further comprising:

a command internal table register mechanism for commands, the commands being a type of said versioned documents, a process internal table register mechanism for independent processes, the independent processes being a type of said versioned documents, a display register mechanism for relating said elements that are the object of processing to one another by links and for relating said elements to those controlled by said internal table register mechanism, a message register mechanism for relating said elements constituting messages that are orders for execution to one another by links, for relating said elements to those controlled by said command internal table register mechanism, for editing said commands, said plurality of versioned documents, said plurality of ledgers, and said plurality of document control registers that have procedures to enable them to be processed, and for sending them to a process register mechanism, the process register mechanism for relating direct messages that are processing commands to a processes which are the processing procedures, for relating them to those controlled by various internal table register mechanisms, for making the individual processes process said direct messages, and for returning results to one of the process register mechanism and other mechanisms, and a display mechanism including a display number register mechanism for controlling individual displays and a display table mechanism, display register mechanism, and an auxiliary mechanism for displaying.

19. A data processing system for maintaining a plurality of documents, each document having at least one object and having at least one version, each object having at least one version, different versions of a document comprising different versions of the at least one object, the system comprising:

at least one document control register, wherein each said document control register has indexes for identifying and controlling records of the object, said document control register having a change control portion and a portion for controlling use conditions, and enabling access to all the versioned documents concerned, the document control register comprising;

a record index storing each document version and indicating specific versions of the objects corresponding to each document version; and an element table index storing each object version and a corresponding version number; and a unit table index temporarily linking, by searching only the at least one document control register and only upon a request for retrieval, each of the document versions to the specified ones and unspecified ones of the versions of the objects for each of the document versions based upon the corresponding version number of each object.

* * * * *